(12) United States Patent
Wang et al.

(10) Patent No.: US 9,682,528 B2
(45) Date of Patent: Jun. 20, 2017

(54) GLASS SUBSTRATE AND METHOD OF TREATING SAME

(71) Applicants: SHENZHEN FUTAIHONG PRECISION INDUSTRY CO., LTD., Shenzhen (CN); FIH (HONG KONG) LIMITED, Kowloon (HK)

(72) Inventors: Ren-Bo Wang, Shenzhen (CN); Chao-Sheng Huang, Shenzhen (CN)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 249 days.

(21) Appl. No.: 14/532,192

(22) Filed: Nov. 4, 2014

(65) Prior Publication Data

US 2015/0056409 A1 Feb. 26, 2015

Related U.S. Application Data

(62) Division of application No. 13/671,684, filed on Nov. 8, 2012, now Pat. No. 8,899,077.

(30) Foreign Application Priority Data

May 31, 2012 (CN) .......................... 2012 1 0176217

(51) Int. Cl.
| | | |
|---|---|---|
| B32B 3/08 | (2006.01) | |
| B32B 17/06 | (2006.01) | |
| C03B 11/14 | (2006.01) | |
| B32B 17/10 | (2006.01) | |
| C03C 19/00 | (2006.01) | |
| C03C 27/00 | (2006.01) | |
| C03B 25/02 | (2006.01) | |
| C03B 29/02 | (2006.01) | |

(52) U.S. Cl.
CPC .............. *B32B 3/08* (2013.01); *B32B 17/061* (2013.01); *B32B 17/10825* (2013.01); *C03B 11/14* (2013.01); *C03B 25/025* (2013.01); *C03B 29/025* (2013.01); *C03C 19/00* (2013.01); *C03C 27/00* (2013.01); *C03B 2215/404* (2013.01); *Y10T 428/24355* (2015.01)

(58) Field of Classification Search
None
See application file for complete search history.

(56) References Cited

U.S. PATENT DOCUMENTS

| | | | | |
|---|---|---|---|---|
| 2,026,606 A | * | 1/1936 | Bausch | ............... C03B 23/22 351/159.73 |
| 2,543,949 A | * | 3/1951 | Wootten | ............... G02C 7/02 351/159.52 |
| 3,445,211 A | * | 5/1969 | Kerstetter | ............... C03C 27/02 65/105 |
| 5,888,119 A | * | 3/1999 | Christianson | ........... B24B 13/01 451/36 |

* cited by examiner

*Primary Examiner* — David Sample
*Assistant Examiner* — Donald M Flores, Jr.
(74) *Attorney, Agent, or Firm* — Steven Reiss

(57) ABSTRACT

An article includes a glass substrate and an insert within the glass substrate, the surface roughness (Ra) of the glass substrate and the insert is about 0.05 μm to about 0.2 μm.

2 Claims, 3 Drawing Sheets

GLASS SUBSTRATE AND METHOD OF TREATING SAME

CROSS-REFERENCE TO RELATED APPLICATIONS

This application is a divisional application of U.S. Ser. No. 13/671,684, filed Nov. 8, 2011, the contents of which are hereby incorporated by reference. The patent application Ser. No. 13/671,684 in turn claims the benefit of priority under 35 USC 119 from Chinese Patent Application 201210176217.9, filed on May 31, 2011.

FIELD

The exemplary disclosure generally relates to a glass substrate and a method for treating a glass substrate.

BACKGROUND

A glass substrate inserted with an insert can be formed by the following steps: a glass substrate is provided, a groove is defined in the glass substrate by milling; an insert is fixed in the groove by binder. However, after a period of use, the binder becomes worn and makes the insert peel from the glass substrate easily. Insert molding method requires high internal temperatures (higher than 800° C.) and high internal press of molding device to provide a fluid glass material which is used to form the glass substrate to overcome the above shortcomings. Additionally, the insert made of metal is easily damaged under the high internal temperature and high internal press.

Therefore, there is room for improvement within the art.

BRIEF DESCRIPTION OF THE DRAWINGS

Implementations of the present technology will now be described, by way of example only, with reference to the attached figures.

DETAILED DESCRIPTION

Figure 1:
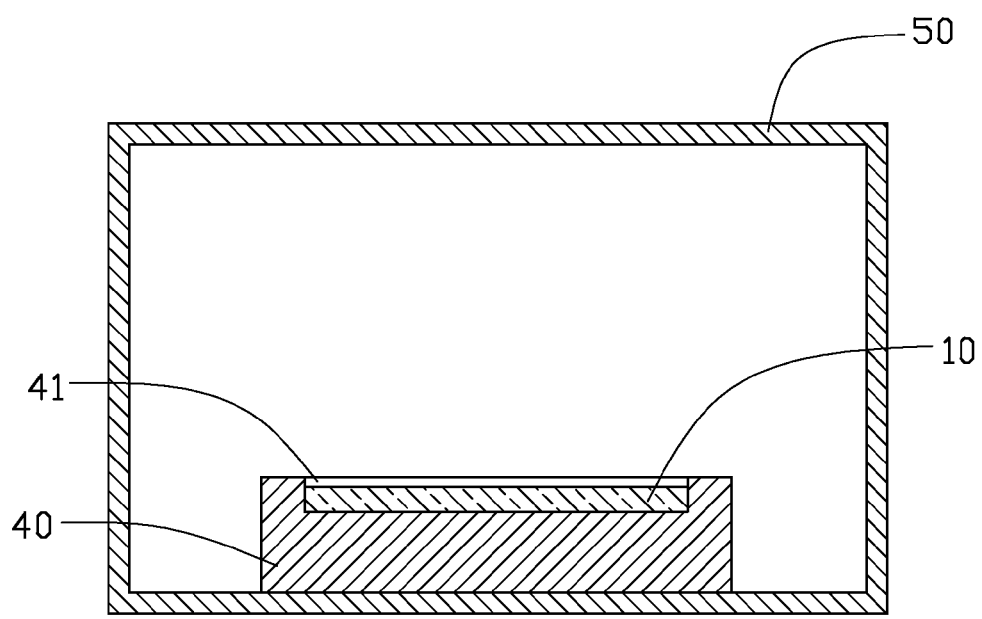
FIG. 1 is a diagrammatic view of an embodiment of a glass substrate treated by softening treatment.
Figure 2:
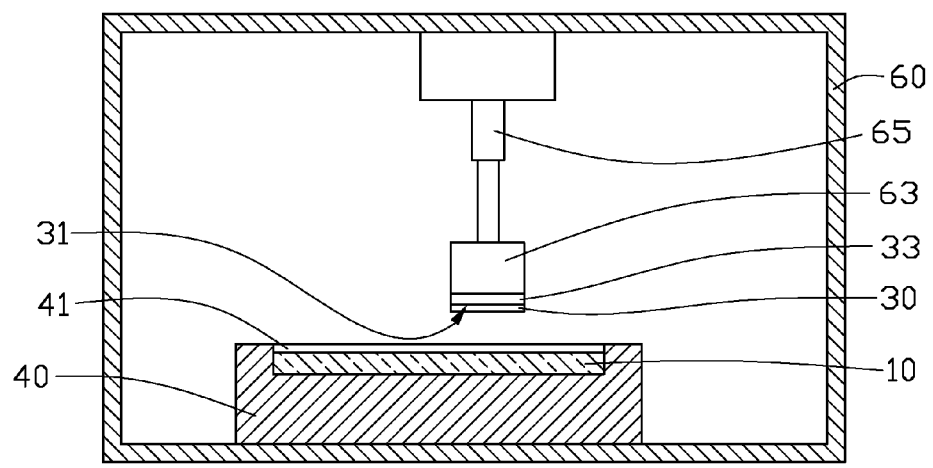
FIG. 2 is a diagrammatic view of glass substrate of FIG. 1 treated by hot pressing.

Referring to FIGS. 1 and 2, an exemplary embodiment of a surface treatment for glass substrate may include at least following steps:

A glass substrate 10 is provided. The glass substrate 10 is degreased to remove contaminants of the substrate 10, such as grease or dirt. The glass substrate 10 is then dried. The glass substrate 10 has a thickness of about 0.5 mm to about 1.2 mm.

The glass substrate 10 is softened by the following steps:

A fastening device 40 is provided. The fastening device 40 defines a receiving groove 41 corresponding to the glass substrate 10. A releasing agent layer is formed on the inner surface of the receiving groove 41. Then, the glass substrate 10 is positioned in the receiving groove 41. The releasing agent layer can prevent softened glass substrate 10 from adhering to the fastening device 40.

The fastening device 40 is positioned in a furnace 50. The internal temperature of the furnace 50 is heated to the softening temperature of the glass substrate 10 and maintained at the softening temperature, for about 20 minutes (min) to about 30 min, to soften the glass substrate 10. In at least one embodiment, the internal temperature of the furnace 50 is heated to about 700° C. to about 800° C. at rate of 20° C./min to about 25° C./min.

An insert 30 is provided. The insert 30 may be made of stainless steel, titanium alloy, or ceramic. The insert 30 includes a first surface 31. The surface roughness (Ra) of the first surface 31 is about 0.05 μm to about 0.2 μm.

A protecting layer 33 is formed on the first surface 31 by spraying or printing. The protecting layer 33 mainly consists of boron nitride. The protecting layer 33 has a thickness of about 20 μm to about 35 μm. In at least one embodiment, paint used to form the protecting layer 33 contains boron nitride powder, and a small amount of organic material, wherein mass percentage of the boron nitride is about 90%-95%, mass percentage of the organic material is about 5%-10%. The organic material mainly contains acetone, ethyl acetate, dimethylbenzene, and mineral oil. The boron nitride powder has a particle size of about 0.8 μm to about 5 μm. The protecting layer 33 can prevent the first surface 31 of the insert 30 from oxidizing and being roughened by heat. Alternatively, the step of forming the protecting layer 33 can be omitted, when the insert 30 is made of ceramic.

The insert 30 is hot pressed at least by the following steps:

A hot pressing chamber 60 is provided. The chamber 60 is connected to a temperature control device (not shown), for controlling internal temperature of the chamber 60. The chamber 60 includes a fixing portion 63, to detachably fixing the insert 30, and a driving device 65, connected to the fixing portion 63. The driving device 65 is mounted on the top wall of the chamber 60 and drives the fixing portion 63, to move up and down vertically in reciprocating motion.

The insert 30 is fixed by the fixing portion 63. The fastening device 40 configured with the softened glass substrate 10 is positioned in the chamber 60 corresponding to the insert 30. The internal temperature of the chamber 60 is about 550° C. to about 650° C. The fixing portion 63 is driven by the driving device 65 moving towards the fastening device 40, and then the insert 30 is inserted into the softened glass substrate 10. After the hot press process, the glass substrate 10 is followed by a slow cooling to room temperature. In the embodiment, the glass substrate 10 is slowly cooled by the following steps: firstly, the internal temperature of the chamber 60 is decreased to about 250° C.-300° C. at a rate of about 5° C./min-10° C./min; secondly, the internal temperature of the chamber 60 is decreased from about 250-300° C. to about 60° C.-80° C. at a rate of about 1° C./min-3° C./min; and lastly, the chamber 60 is opened and cooled to room temperature naturally.

The protecting layer 33 is removed from the insert 30 by wrapping the insert 30 with a cloth immersed with water.

The first surface 31 is ground and polished. In at least one embodiment, "300-1000#" abrasive paper is used to remove burr of the glass substrate 10. After grinding, the surface roughness (Ra) of the first surface 31 is about 0.4 μm to about 1.0 μm. Then, the glass substrate 10 is polished by a polishing machine using a polishing solution containing ferric oxide and cerium oxide for about 40 min to about 80 min. After polishing, the surface roughness (Ra) of the glass substrate 10 and the first surface 31 are about 0.05 μm to about 0.2 μm.

Figure 3:
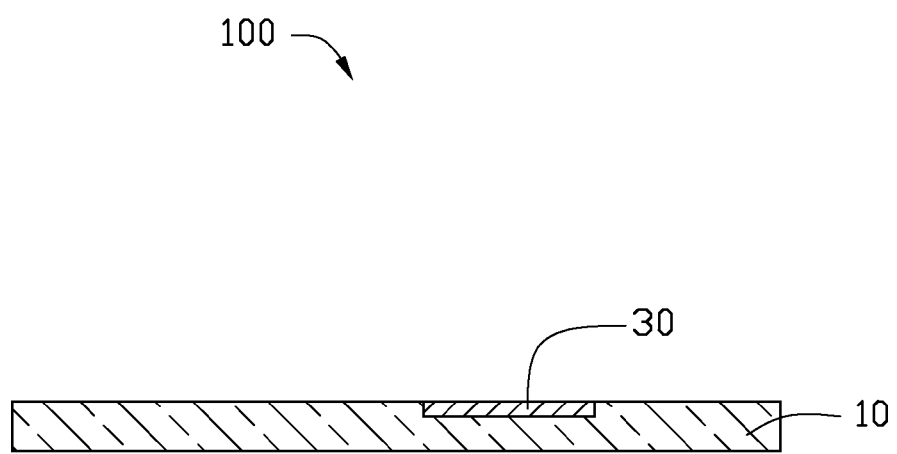
FIG. 3 is a cross-sectional view of an embodiment of an article.

Referring to FIG. 3, an article 100 manufactured by the surface treatment method is also provided. The article 100 includes a glass substrate 10, and an insert 30 inserted into the glass substrate 10 by hot pressing. The glass substrate 10 has a thickness of about 0.5 mm to about 1.2 mm. The insert 30 may be made of stainless steel, titanium alloy or ceramic. The surface roughness (Ra) of the glass substrate 10 and the insert 30 are about 0.05 μm to about 0.2 μm.

During the hot pressing process, the insert 30 is heated to about 550 to about 650° C. to prevent the formation of stress caused by temperature difference of the softened glass substrate 10 and the insert 30. During the cooling process, the difference of materials between the glass substrate 10 and the insert 30 makes a difference of cooling rate and provides a large temperature difference between the glass substrate 10 and the insert 30. However, the slow cooling process can prevent the glass substrate 10 or the insert 30 from being cracked or broken due to the large temperature difference, and can also avoid the formation of gap between the glass substrate 10 and the insert 30 to securely bond the insert 30 to the glass substrate 10.

It is to be understood, however, that even through numerous characteristics and advantages of the exemplary disclosure have been set forth in the foregoing description, together with details of the system and function of the disclosure, the disclosure is illustrative only, and changes may be made in detail, including in matters of shape, size, and arrangement of parts within the principles of the disclosure to the full extent indicated by the broad general meaning of the terms in which the appended claims are expressed.

What is claimed is:

1. An article comprising:
   a glass substrate; and
   an insert within the glass substrate, the insert being made of stainless steel or titanium alloy, the surface roughness (Ra) of the glass substrate and the insert being between 0.05 μm and 0.2 μm, and the insert bonded to the glass substrate by hot pressing.

2. The article of claim 1, wherein the glass substrate has a thickness of between 0.5 mm and 1.2 mm.

* * * * *